(12) United States Patent
Brutch et al.

(10) Patent No.: US 8,064,605 B2
(45) Date of Patent: Nov. 22, 2011

(54) METHODS AND APPARATUS FOR PROVIDING UPGRADEABLE KEY BINDINGS FOR TRUSTED PLATFORM MODULES

(75) Inventors: Tasneem Brutch, Cornelius, OR (US); Alok Kumar, Santa Clara, CA (US); Vincent R. Scarlata, Beaverton, OR (US); Faraz A. Siddiqi, Portland, OR (US); Ned M. Smith, Beaverton, OR (US); Willard M. Wiseman, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 11/863,233

(22) Filed: Sep. 27, 2007

(65) Prior Publication Data

US 2009/0089582 A1 Apr. 2, 2009

(51) Int. Cl.
*H04L 9/00* (2006.01)
*H04L 29/06* (2006.01)

(52) U.S. Cl. ........................................ 380/277; 713/164

(58) Field of Classification Search .................. 380/277; 713/164
See application file for complete search history.

(56) References Cited

U.S. PATENT DOCUMENTS

| | | | |
|---|---|---|---|
| 6,813,703 B2 | 11/2004 | Nishikawa et al. |
| 6,895,501 B1 | 5/2005 | Salowey |
| 6,922,774 B2 | 7/2005 | Meushaw et al. |
| 7,058,807 B2 | 6/2006 | Grawrock et al. |
| 7,076,655 B2 | 7/2006 | Griffin et al. |
| 7,177,967 B2 | 2/2007 | Jeyasingh et al. |
| 7,222,062 B2 | 5/2007 | Goud et al. |
| 7,380,119 B2 | 5/2008 | Bade et al. |
| 7,454,544 B2 | 11/2008 | Bond et al. |
| 7,478,233 B2 | 1/2009 | Olson et al. |
| 7,512,815 B1 | 3/2009 | Munetoh |
| 7,552,419 B2 | 6/2009 | Zimmer et al. |

(Continued)

FOREIGN PATENT DOCUMENTS

WO  WO 02/06929 A2  1/2002

OTHER PUBLICATIONS

Intellectual Property Office of Great Britain, Combined Search and Examination Report Under Sections 17 and 18(3), Dated Dec. 19, 2008, in a related application.

(Continued)

*Primary Examiner* — Techane Gergiso
(74) *Attorney, Agent, or Firm* — Trop, Pruner & Hu, P.C.

(57) ABSTRACT

A processing system with a trusted platform module (TPM) supports migration of digital keys. For instance, an application in the processing system may create a first configuration key as a child of a TPM storage root key (SRK) when the processing system has a first configuration. The application may also create an upgradable root user key associated with an upgrade authority as a child of the first configuration key. The application may also create a user key as a child of the upgradable root user key. When the processing system has a second configuration, the application may create a second configuration key as a child of the SRK. The application may request migration approval from the upgrade authority. In response to receiving the approval from the upgrade authority, the application may migrate the root user key to be a child of the second configuration key. Other embodiments are described and claimed.

16 Claims, 4 Drawing Sheets

U.S. PATENT DOCUMENTS

| | | |
|---|---|---|
| 7,590,867 B2 | 9/2009 | Scarlata et al. |
| 2002/0059286 A1 | 5/2002 | Challener |
| 2002/0169717 A1 | 11/2002 | Challener |
| 2002/0193615 A1 | 12/2002 | Aksela et al. |
| 2002/0194482 A1 | 12/2002 | Griffin et al. |
| 2003/0023776 A1 | 1/2003 | Kolinummi et al. |
| 2003/0097578 A1* | 5/2003 | England et al. ............... 713/191 |
| 2003/0115453 A1 | 6/2003 | Grawrock |
| 2003/0115468 A1 | 6/2003 | Aull et al. |
| 2003/0133575 A1 | 7/2003 | Challener |
| 2003/0226031 A1 | 12/2003 | Proudler et al. |
| 2003/0229485 A1 | 12/2003 | Nishikawa et al. |
| 2004/0031030 A1 | 2/2004 | Kidder et al. |
| 2004/0151319 A1* | 8/2004 | Proudler ....................... 380/277 |
| 2004/0264797 A1 | 12/2004 | Lippincott et al. |
| 2005/0021968 A1* | 1/2005 | Zimmer et al. ............... 713/176 |
| 2005/0086509 A1 | 4/2005 | Ranganathan |
| 2005/0120219 A1* | 6/2005 | Munetoh et al. ............. 713/176 |
| 2005/0130611 A1 | 6/2005 | Lu et al. |
| 2005/0132122 A1 | 6/2005 | Rozas |
| 2005/0133582 A1 | 6/2005 | Bajikar |
| 2005/0138370 A1 | 6/2005 | Goud et al. |
| 2005/0144440 A1 | 6/2005 | Catherman et al. |
| 2005/0166024 A1 | 7/2005 | Angelo et al. |
| 2005/0235141 A1* | 10/2005 | Ibrahim et al. ................ 713/164 |
| 2005/0246552 A1 | 11/2005 | Bade et al. |
| 2005/0286792 A1 | 12/2005 | Mehta et al. |
| 2006/0002471 A1 | 1/2006 | Lippincott et al. |
| 2006/0015718 A1* | 1/2006 | Liu et al. ........................ 713/164 |
| 2006/0020781 A1 | 1/2006 | Rozas et al. |
| 2006/0026422 A1 | 2/2006 | Bade et al. |
| 2006/0031436 A1 | 2/2006 | Sakata et al. |
| 2006/0075223 A1 | 4/2006 | Bade et al. |
| 2006/0140501 A1 | 6/2006 | Tadas |
| 2006/0190986 A1 | 8/2006 | Mont et al. |
| 2006/0212939 A1 | 9/2006 | England et al. |
| 2006/0230401 A1 | 10/2006 | Grawrock |
| 2006/0256105 A1 | 11/2006 | Scarlata |
| 2006/0256107 A1 | 11/2006 | Scarlata |
| 2006/0256108 A1 | 11/2006 | Scarlata |
| 2007/0003064 A1* | 1/2007 | Wiseman et al. ............. 380/281 |
| 2007/0016766 A1* | 1/2007 | Richmond et al. ............ 713/100 |
| 2007/0043896 A1 | 2/2007 | Daruwala et al. |
| 2007/0094719 A1* | 4/2007 | Scarlata ............................ 726/9 |
| 2007/0130472 A1* | 6/2007 | Buer et al. ..................... 713/182 |
| 2007/0149554 A1 | 6/2007 | Rozas et al. |
| 2007/0168048 A1* | 7/2007 | Allen et al. ........................ 700/2 |
| 2007/0226496 A1* | 9/2007 | Maletsky et al. ............. 713/168 |
| 2007/0226786 A1 | 9/2007 | Berger et al. |
| 2007/0256125 A1 | 11/2007 | Chen |
| 2007/0300069 A1 | 12/2007 | Rozas |
| 2008/0059799 A1 | 3/2008 | Scarlata |
| 2009/0169012 A1 | 7/2009 | Smith et al. |
| 2009/0271618 A1* | 10/2009 | Camenisch et al. .......... 713/155 |

OTHER PUBLICATIONS

Chinese Patent and Trademark Office, First Office Action dated Jun. 8, 2010 in Chinese patent application No. 200810188778.4.

Nancy Sumrall, et al., "Trusted Computing Group (TCG) and the TPM 1.2 Specification", Intel Developer Forum, pp. 1-32, Sep. 2003.

Charles Scott Powell, "Foundations for Trusted Computing, Net Project", Nov. 7, 2002, London, England, pp. 1-87.

"Trusted Computing Platform Alliance (TCPA) Main Specification Version 1.1 b", Trusted Computing Group, Inc. 2003, pp. 1-332.

"TPM Main Part 1 Design Principles, Specification Version 1.2 Revision 62", Trusted Computing Group, Oct. 2, 2003, pp. 1-161.

Mario Strasser, "A Software-Based TPM Emulator for Linux", *Semester Thesis, Department of Computer Science*, Jul. 2004. pp. 1-56, Zurich, Switzerland.

Tal Garfinkle, et al. "Terra: A Virtual Machine-Based Platform for Trusted Computing", Computer Science Department, Stanford University, Oct. 19, 2003, pp. 1-14.

PCT International Search Report for Application No. PCT/US2005/019724, filed Jun. 3, 2005, mailed Sep. 5, 2005.

Vincent Scarlata, Method and Apparatus for Remotely Provisioning Software-Based Security Coprocessors, U.S. Appl. No. 11/171,880, filed Jun. 29, 2005.

Vincent Scarlata, Method and Apparatus for Generating Endorsement Credentials for Software-Based Security Coprocessors, U.S. Appl. No. 11/171,856, filed Jun. 29, 2005.

Vincent Scarlata, Method and Apparatus for Providing Software-Based Security Coprocessors, U.S. Appl. No. 11/171,133, filed Jun. 29, 2005.

"What is Trusted Grub?", Applied Data Security Group, http://www.prosec.rub.de/trusted_grub.html.

VMWARE Inc., "VMware Reinvents Enterprise Desktop Management and Security with Breakthrough New Product", Sep. 20, 2004, http://www.wmware.com/new/releases/ace_announce.html.

Barham et al., "Xen and the Art of Virtualization", University of Cambridge Computer Laboratory, pp. 14, 2003. Last accessed Jan. 29, 2008, http://www.cl.cam.ac.uk/Research/SRG/netos/papers/2003-xensosp.pdf.

George W. Dunlap, et al. "ReVirt: Enabling Intrusion Analysis through Virtual-Machine Logging and Replay", Proceedings of the 2002 Symposium on Operating Systems Design and Implementation, pp. 1-14, http://www.eecs.umich.edu/CoVirt/papers/revirt.pdf.

Joan G. Dyer et al., "Building the IBM 4758 Secure Processor", Oct. 2001, pp. 1-10, http://ieeexplore.org/iel5/20660/00955100.pdf?arnumber=955100.

Fraser et al., "Safe Hardware Access with the Xen Virtual Machine Monitor", University of Cambridge Computer Laboratory, pp. 10. Last accessed Jan. 29, 2008, http://www.cl.cam.ac.uk/Research/SRG/netos/papers/2004-oasis-ngio.pdf.

Garfinkle et al., "Terra: A Virtual Machine-Based Platform for Trusted Computing", (presentation), Nov. 10, 2004, p. 23. Last accessed on Jan. 29, 2008, http://www.cs.utexas.edu/~shmat/courses/cs395t_fall04/rager.pdf.

The Trusted Computing Group, "What is the Trusted Computing Group?" (Internet home page) 2005, http://www.trustedcomputing-group.org/home.

John Marchensini, et al., "Experimenting with TCPA/TCG Hardware", Computer Science Technical Report TR2003-476, Dec. 15, 2003, pp. 1-20, http://www.cs.dartmouth.edu/~sws/papers/mswm03.pdf.

Meushaw et al., "NetTop: Commercial Technology in High Assurance Applications", Tech Trend Notes, vol. 9, ed. 4, Research and Advanced Technology Publication, Fall 2000, pp. 9. Last accessed on Jan. 29, 2008, http://www.vmware.com/pdf/TechTrendNotes.pdf.

David Afford "The Need for TCPA", IBM Research, Oct. 2002, pp. 7. Last Accessed Jan. 29, 2008, http://www.research.ibm.com/gsal/tcpa/why_tcpa.pdf.

Sailer et al., "Design and Implementation of a TCG-based Integrity Measurement Architecture", IBM Research Report; IBM Research Division, New York, pp. 1-17. Last Accessed on Feb. 7, 2008, http://www.ece.cmu.edu/~adrian/630-f04/readings/sailer-zhang-jaeger-doorn-2004.pdf.

Michael, M. Swift et al., "Improving the Reliability of Commodity Operating Systems", Department of Computer Science and Engineering, University of Washington, Oct. 2003, pp. 1-16, http://www.cs.rochester.edu/sosp2003/papers/p116-swift.pdf.

Vincent Scarlata, Method And Apparatus For Migrating Software-Based Security Coprocessors, U.S. Appl. No. 11/171,134, filed Jun. 29, 2007.

Stefan Berger et al., "vTPM: Virtualizing the Trusted Platform Module"; Security '06: 15*th* Usenix Security Symposium, IBM T.J. Watson Research Center, Hawthorne, NY USENIX Association, pp. 305-320.

Sadeghi et al., "Property-based Attestation for Computing Platforms: Caring about properties, not mechansim", Available from http://delivery.acm.org/10.1145/1070000/1066038/p67-sadeghi.pdf?key1=1066038&key2=1066038&key2=4269876511&coll=&dl=ACM&CFID=15151515&CFTOKEN=6184618.

Rozas, et al., Dynamic Measurement Of An Operating System In A Virtualized System, U.S. Appl. No. 11/513,963, filed Aug. 31, 2006.

N. Petroni et al., "Copilot—a Coprocessor-based Kernel Runtime Integrity Monitor"(http://www.usenix.org/publications/library/proceedings/sec04/etch/full_papers/petroni/petroni.pdf) Proceedings of the 13th USENIX Security Symposium, Aug. 9-13, 2004.

David Grawrock, The Intel Safer Computing Initiative: Building Blocks for Trusted Computing, Intel Press, Jan. 2006.

Intel Trusted Execution Technology: Preliminary Architecture Specification, Intel Corp., Nov. 2006.

Intel Corp., New Client Virtualization Usage Models Using Intel Virtualization Technology, Intel Technology Journal, vol. 10, Issue 03, Aug. 10, 2006, cover pg & 204-217.

Ned Smith, Methods and Apparatus for Creating an Isolated Partition for a Virtual Trusted Platform Module, U.S. Appl. No. 11/837,378, filed Aug. 10, 2007.

Mechanisms to Control Access to Cryptographic Keys and to Attest to the Approved Configurations of Computer Platforms, U.S. Appl. No. 11/511,773, filed Aug. 29, 2006.

David W. Grawrock, Platform Configuration Register Virtualization Apparatus, Systems, and Methods, U.S. Appl. No. 11/095,034, filed Mar. 31, 2004.

Ahmad-Reza Sadeghi, et al. "Property-Based Attestation for Computing Platforms, Caring about properties, not mechanisms," 2005, pp. 1-12.

Tan, Hock Kim, et al., "Certificates for Mobile Code Security," 2002, pp. 1-6.

Kuhlmann, Dirk, et al., "An Open Trusted Computing Architecture—Secure Virtual Machines Enabling User-Defined Policy Enforcement," Aug. 2006, pp. 1-16.

Japanese Patent Office, Office Action mailed Jul. 5, 2011 in Japanese application No. 2008-248778.

* cited by examiner

FIG. 4

METHODS AND APPARATUS FOR PROVIDING UPGRADEABLE KEY BINDINGS FOR TRUSTED PLATFORM MODULES

FIELD OF THE INVENTION

The present disclosure relates generally to the field of data processing, and more particularly to methods and related apparatus for providing upgradeable key bindings for trusted platform modules.

BACKGROUND

A processing system may include hardware resources, such as a central processing unit (CPU), random access memory (RAM), and nonvolatile storage such as read only memory (ROM) and one or more hard disk drives. The processing system may also include data and software resources, such as a basic input/output system (BIOS), a hypervisor or virtual machine monitor (VMM), and one or more operating systems (OSs). When the processing system is started or reset, it may load and run the BIOS. The processing system may then load and run one or more of the VMM and the OSs.

The data stored in a processing system may have high value. The data may include trade secrets and other confidential business data or personal information such as social security numbers and credit card numbers. In addition, processing systems are frequently used for electronic business transactions. To improve computer security, the Trusted Computing Group (TCG), a not-for-profit industry-standards organization, has formed and adopted specifications for more secure processing systems.

TCG specifications define trusted processing system platforms, computer platforms which may behave in a particular manner for a specific purpose. A trusted platform may provide data security functions such as data encryption and decryption and data storage. A key component of a trusted platform is the trusted platform module (TPM). A TPM which may perform operations such as cryptographic hashes to detect loss of integrity, public and secret key encryption to prevent unauthorized disclosure of data, and digital signing to authenticate transmitted information. The TCG Protected Storage mechanisms, which may be rooted in hardware, may be used to protect keys, secrets and hash values. Additional details on TPMs may be found in specifications such as the Trusted Computing Group (TCG) TPM Specification Version 1.2, dated Oct. 2, 2003 (hereinafter the "TPM specification"), which includes parts such as Design Principles, Structures of the TPM, and TPM Commands. The TPM specification is published by the TCG and is currently available from the Internet at www.trustedcomputinggroup.org/home.

A trusted platform may also demonstrate that it operates in a safe configuration when it has access to confidential data by measuring the configuration and sealing the data to the configuration. TCG specifications provide for measuring the components of a computer platform and for storing the results of the measurements. The measurements of a configuration may be hashed and stored in platform configuration registers (PCRs). A trusted platform may allow access to data only under a particular configuration of the trusted platform. The TPM seal operation may encrypt data to a specific set of PCR values or an authorization value. To unseal the data, and thereby gain access to it, the authorization must be presented and the set of values stored in the PCRs must match the set used in the seal operation. Similarly, a signing key may be locked to a set of PCR values during key generation within the TPM.

Changes in a platform configuration may render sealed data or PCR locked keys inaccessible. To gain access to sealed data under a modified configuration, the data may first have to be accessed under the original configuration and resealed to the modified configuration. Gaining access to the data may prove difficult when the data is distributed over multiple computer platforms. Generally, keys locked to a particular platform configuration are not accessible from other configurations.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

One use of the TPM is for data protection. A TPM allows its user to protect data while specifying exactly what platform configuration has been reviewed and is considered safe or authorized to access the data. This capability is typically accomplished using PCR bindings on a key. PCR bindings may yield very rigid protection of data, where any change to the software that executes on the system results in the inability to access the data.

This disclosure describes methods for using the TPM's configuration binding capabilities to lock data to a configuration in a manner that is flexible enough to allow the software in that configuration to be upgraded, under a trusted upgrade service, without causing the processing system to lose access to that data. Additionally, a processing system may provide for recovery of data when the processing system is no longer able to get into the predefined safe or approved configuration (e.g., to allow recovery from a failed upgrade).

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Figure 1:
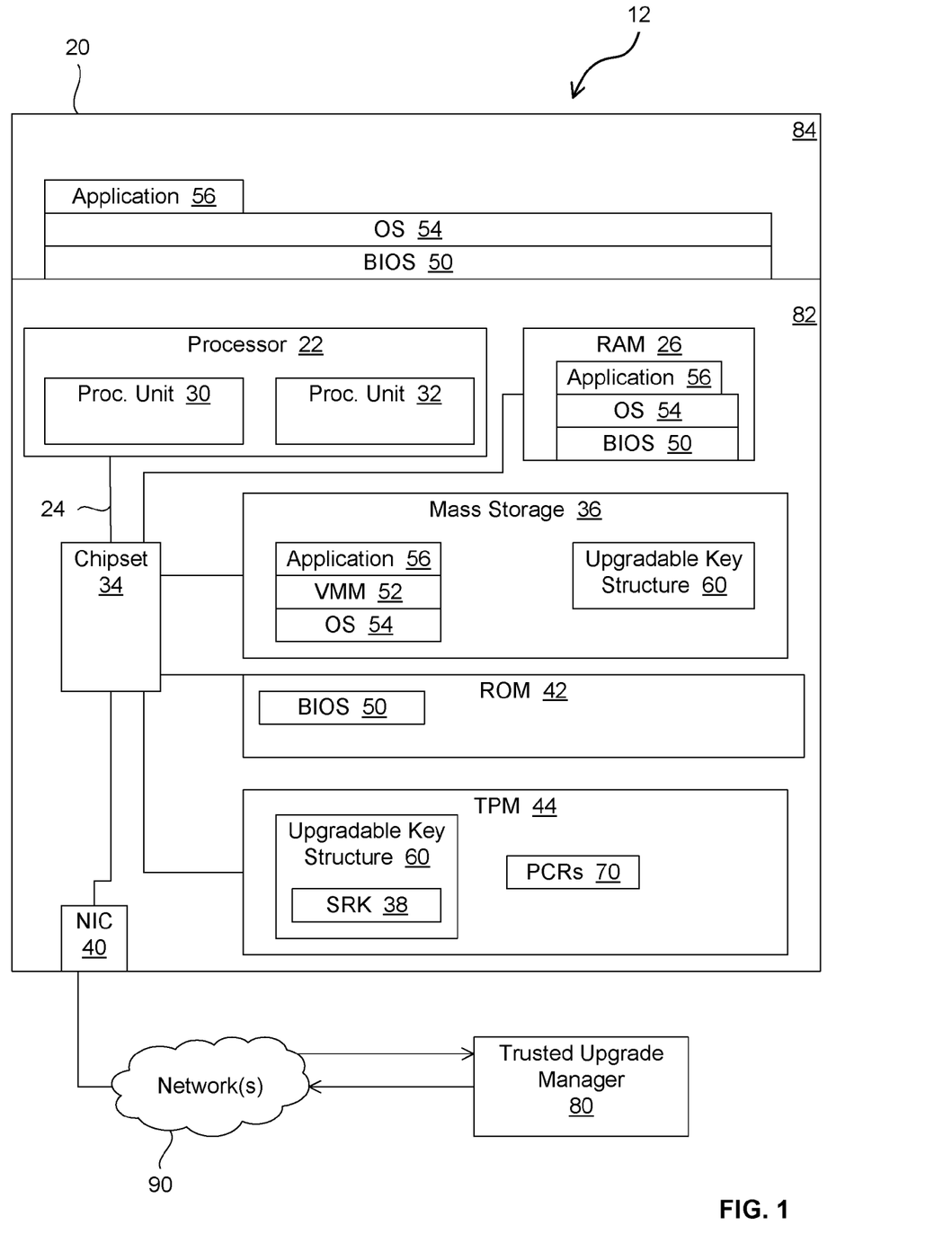
FIG. 1 is a block diagram depicting a suitable data processing system in which certain aspects of an example embodiment of the present invention may be implemented.

FIG. 1 is a block diagram depicting a suitable data processing system 20 in which certain aspects of an example embodiment of the present invention may be implemented. Data processing system 20 has various hardware components 82, such as a CPU 22, communicatively coupled to various other components via one or more system buses 24 or other communication pathways or mediums. For example, processor 22 may be communicatively coupled to one or more volatile or nonvolatile data storage devices (e.g., RAM 26, ROM 42, mass storage devices 36). Suitable storage devices may include, without limitation, hard disk drives, floppy disk drives, optical disk drives, tapes, flash memory, memory sticks, digital video disks, phase change memory (PCM), etc. Processor 22 may also be communicatively coupled to one or more network interface controllers (NICs) 40, video controllers, integrated drive electronics (IDE) controllers, small computer system interface (SCSI) controllers, universal serial bus (USB) controllers, input/output (I/O) ports, input devices, output devices such as a display, etc.

In the embodiment of FIG. 1, CPU 22 includes a first processing unit 30 and a second processing unit 32. Alternatively, a processing system may include a CPU with one processing unit, or multiple processors, each having at least one processing unit. In systems with multiple processing units, those processing units may be implemented as processing cores, as Hyper-Threading (HT) technology, or as any other suitable technology for executing multiple threads simultaneously or substantially simultaneously.

Processing system 20 also includes a TPM 44. For purposes of this disclosure, the term "TPM" refers to the control logic and protected storage in a processing system that work together to provide for (a) storing a measurement of the system configuration (e.g., a hash of the system configuration), (b) providing verified evidence of the system configuration (e.g., a signed configuration measurement), and (c) restricting access to protected digital keys, based at least in part on whether a current system configuration matches a predetermined approved configuration. A TPM may be implemented as a discrete module that is communicatively coupled to a processor, possibly via a chipset or other intermediate modules. Alternatively, some or all of the control logic and protected storage for a TPM may be implemented as part of one or more other components (e.g., a NIC, an I/O controller, an I/O hub, a processor, etc.). In the embodiment of FIG. 1, TPM 44 is a discrete module that is communicatively coupled to processor 22 via a chipset 34. Chipset 34 may include one or more bridges or hubs for communicatively coupling system components, as well as other logic and storage components.

Some components may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like. For purposes of this disclosure, the term "ROM" may be used in general to refer to nonvolatile memory devices such as erasable programmable ROM (EPROM), electrically erasable programmable ROM (EEPROM), flash ROM, flash memory, etc. Also, the term "bus" refers to shared communication pathways, as well as point-to-point pathways.

Processing system 20 may be controlled, at least in part, by input from conventional input devices, such as a keyboard, a mouse, etc., and/or by directives received from another machine, biometric feedback, or other input sources or signals. Processing system 20 may utilize one or more connections to one or more remote data processing systems 80, such as through NIC 40, a modem, or other communication ports or couplings. Processing systems may be interconnected to form a data processing environment 12, through use of a physical and/or logical network 90, such as a local area network (LAN), a wide area network (WAN), an intranet, the Internet, etc. Communications involving the network may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as worldwide interoperability for microwave access (WiMAX) or wireless metropolitan area network (WirelessMAN) protocols, and information concerning those protocols is currently available at grouper.ieee.org/groups/802/16/index.html.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or nonvolatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations. The programs in processing system 20 may be considered components of a software environment 84.

For instance, when processing system 20 boots, a BIOS 50 may be loaded into RAM 26 and executed within software environment 84. Processing system may also load and run a VMM 52 and/or one or mode OSs 54 within software environment 84. For example, if processing system 20 has not been configured for virtualization, VMM 52 may be unnecessary, and applications may run on top of OS 54. In other embodiments, VMM 52 may launch various guest OSs and user applications in separate virtual machines within software environment 84.

TPM Key Structure

A typical conventional use of a TPM involves creating a central key for an application or system, and then creating a logical hierarchy of keys as children or descendants of that key. All of these keys may be considered user keys, and the central key may be called the Root User Key. Any or all of these keys may have PCR bindings. However, a child key cannot be loaded into the TPM unless the bindings for the parents of that child key are satisfied. Consequently, it is usually sufficient to protect the Root User Key with bindings and not every individual child key.

The types of programs that may use TPM key structures include, without limitation, system software such as VMM 52 and OS 54, and user applications such as application 56. For instance, a VMM or an OS may use TPM keys for functions such as file encryption, identity management, and configuration attestation. A media player application may use TPM keys for purposes of digital rights management (DRM). Software applications for other purposes (e.g., file encryption, virus protection, etc.) may use TPM keys as well. For purposes of this disclosure, the term "system software" refers to the software that runs under the user applications.

As described in greater detail below with regard to FIG. 3, the present disclosure presents a TPM key structure 60 that supports migration to a different configuration.

Figure 2:
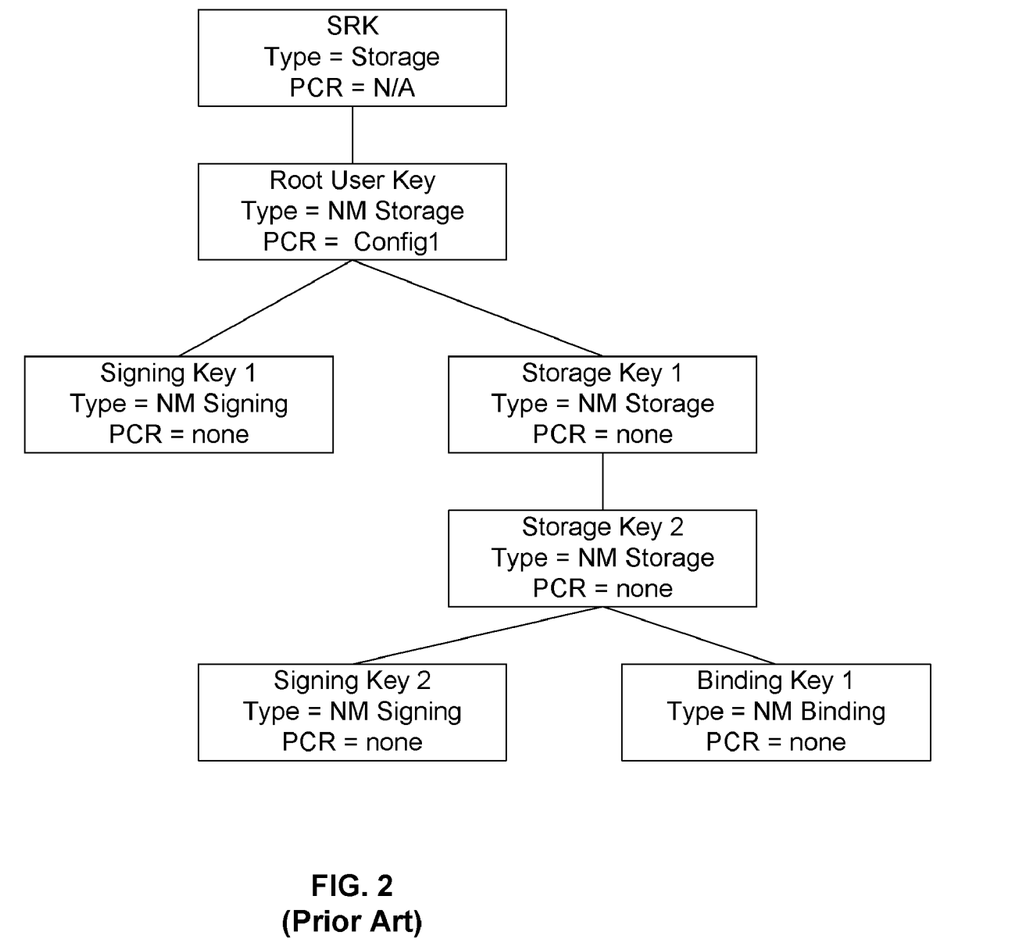
FIG. 2 is a block diagram depicting a conventional key structure.

By contrast, FIG. 2 is a block diagram depicting a conventional TPM key structure. In this structure, all keys are non-migratable (NM) by default. Specifically, the Storage Root Key (SRK) is non-migratable by definition, and the other keys have a "type" of NM storage, NM signing, or NM binding. Also, the Root User Key is bound to some known configuration "Config1" (i.e., PCR=Config1). However, the other keys have no PCR bindings (i.e., PCR=none). Any changes to the software in the processing system may result in the inability to access the keys that are bound to the Root User Key, since the system configuration then would not match the configuration to which the Root User Key is bound.

Figure 3:
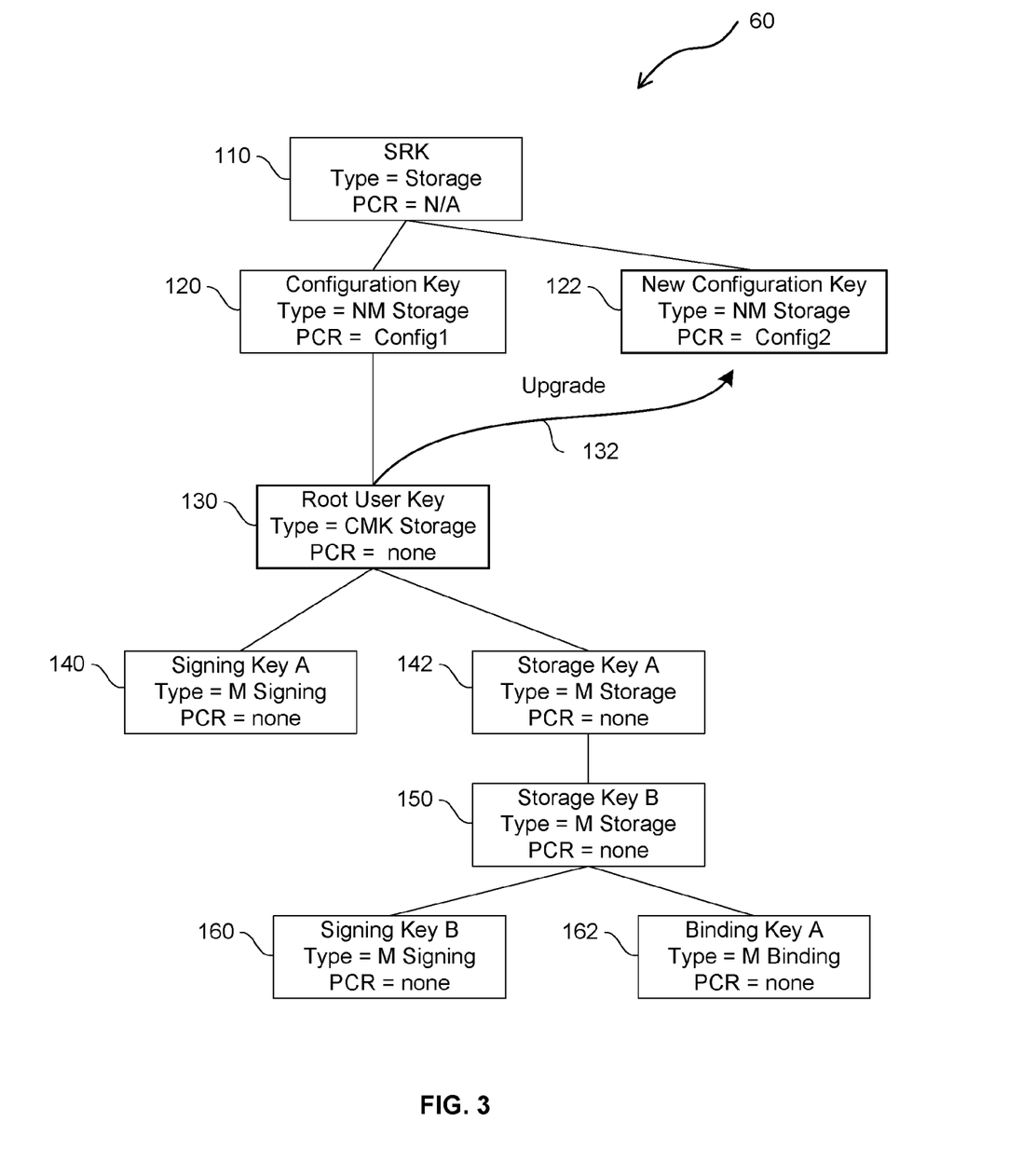
FIG. 3 is a block diagram depicting an example embodiment of a key structure with upgradeable key bindings.

FIG. 3 is a block diagram depicting an example embodiment of a TPM key structure that provides upgradeable key bindings. This key structure may be referred to as an upgradeable key structure 60. As indicated above, upgradeable key structures may be used by a wide variety of programs or applications. For instance, application 56 may be media player application, and it may establish upgradeable key structure 60 to protect some or all of the keys used for DRM. When the computer is running, some or all of the keys in upgradeable key structure 60 may reside in TPM 44 and/or RAM 26. When the computer is turned off, some of those keys may be stored in mass storage 36. When a key resides outside TPM 44, such as in RAM 26 or mass storage 36, it is stored in encrypted form, following encryption and exportation by TPM 44.

Compared to the conventional structure, upgradeable key structure 60 includes an extra layer in the hierarchy between the Root User Key 130 and the SRK 110, which is embedded in TPM 44. In the embodiment FIG. 3, the extra layer in the hierarchy is the Configuration Key 120. Root User Key 130 is a child of Configuration Key 120, and other user keys form a hierarchy below Root User Key 130. The other user keys in the example embodiment include a Signing Key A 140 and a Storage Key A 142 (which are children of Root User Key 130), a Storage Key B 150 (which is a child of Storage Key A), and a Signing Key B 160 and a Binding Key A 162 (which are children of Storage Key B).

Root User Key 130 is a TPM certified migratable key (CMK). A CMK can be migrated to a new parent key only under the control of an entity specified when the CMK is created. The entity selected for controlling migrations for Root User Key 130 may be referred to as the trusted upgrade authority or the trusted upgrade manager. The processing system that the trusted upgrade authority uses to handle migration approval requests may also be referred to as the trusted upgrade authority or the trusted upgrade manager 80.

Thus, in the example embodiment, TPM 44 may not allow Root User Key 130 to be migrated to a new parent key unless processing system 20 has received an authorization token that was created with a private key of trusted upgrade manager 80. Accordingly, to specify the trusted upgrade authority for Root User Key 130, application 56 may use the public key of trusted upgrade manager 80 when creating Root User Key 130. In other words, application 56 may incorporate a public key of trusted upgrade manager 80 in Root User Key 130. TPM 44 then may allow Root User Key 130 to be migrated only after processing system 20 has received approval from trusted upgrade manager 80, in the form of an authorization token that was created with the corresponding private key of trusted upgrade manager 80. However, trusted upgrade manager 80 may refuse to issue such an authorization token unless processing system 20 provides an acceptable credential describing the New Configuration Key 122.

Figure 4:
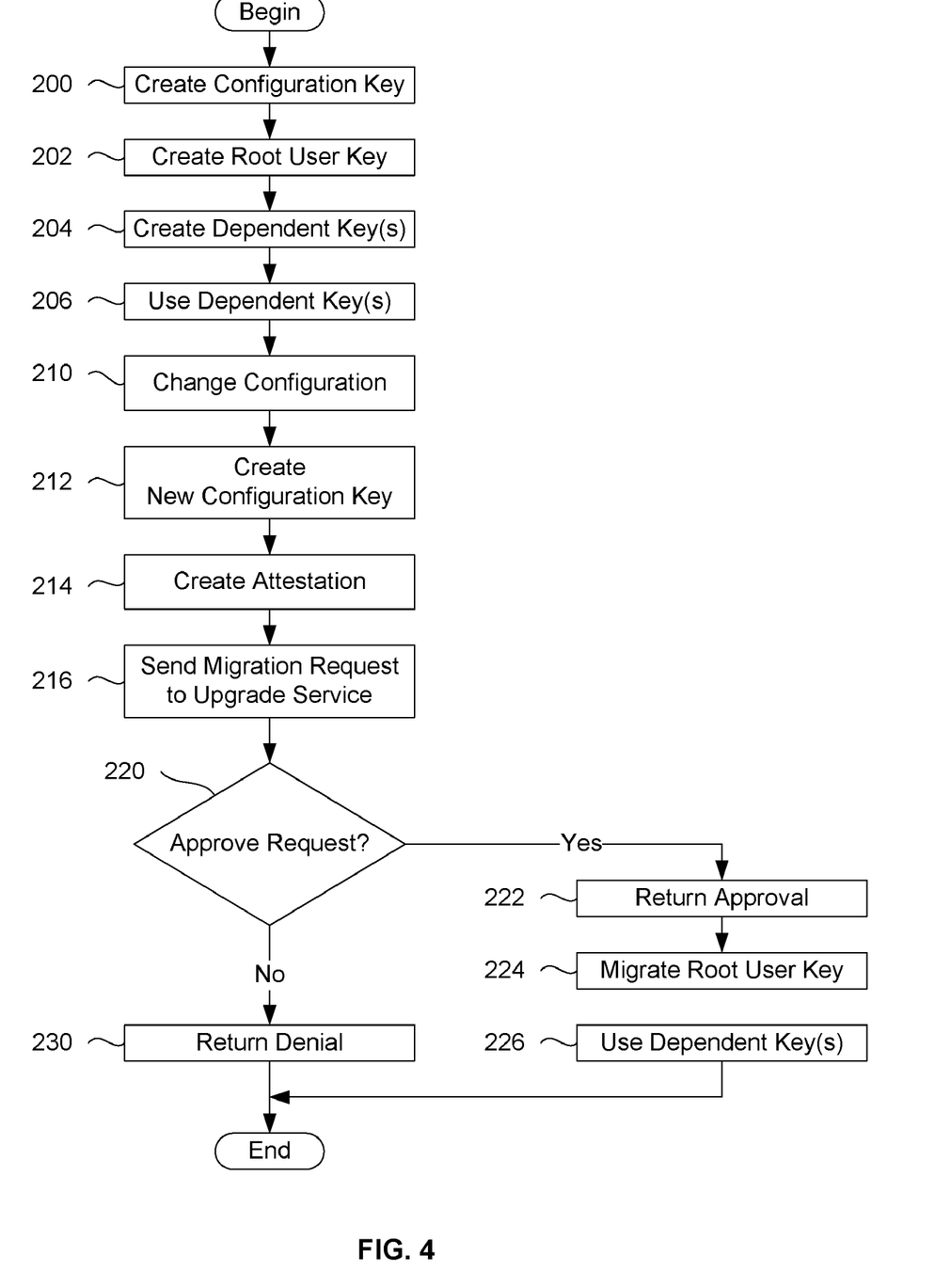
FIG. 4 is a flowchart of an example embodiment of a process for upgrading key bindings in the data processing system of FIG. 1.

FIG. 4 is a flowchart of an example embodiment of a process for upgrading key bindings in processing system 20. The process begins after approved versions of the system software (e.g., OS 54) and application 56 have been installed on processing system 20. As indicated at block 200, application 56 may then create Configuration Key 120 as a child of SRK 110, with PCR bindings on Configuration Key 120 set to the current platform configuration, known as Config1. For instance, to bind Configuration Key 120 to Config1, application 56 may be pre-programmed with a selection of PCRs that are applicable to the trustworthiness of application 56. Application 56 then reads the current values of those PCR out of the TPM, and includes those PCR values during the creation of Configuration Key 120.

Application 56 may then create Root User Key 130 as a child of Configuration Key 120, as shown at block 202. Furthermore, application 56 may set the migration authority on Root User Key 130 to be trusted upgrade manager 80, as indicated above. Application 56 may then create one or mode other user keys within upgradeable key structure 60 (e.g., Signing Key A 140, Storage Key A 142, Storage Key B 150, etc.) as descendants of Root User Key 130, as shown at block 204. These descendants of a Certified Migratable Key are also created as migratable (type=M) keys. However, application 56 may set the authorization to migrate these keys to a random unpublished value or a null pubic key to ensure they are not individually migrated. As indicated at block 206, application 56 may then access and use one or more of those descendent or dependent keys, for instance to encrypt or decrypt data.

Then, as indicated at block 210, the configuration of processing system 20 may be changed or upgraded. For instance, the change may be an upgrade to a new version of application 56, an upgrade to OS 54, etc. This change causes a corresponding change to the values in the PCRs 70 in TPM 44. The new values of the PCRs may be referred to as Config2.

As indicated at block 212, application 56 may then generate a new Configuration Key, referred to herein as New Configuration Key 122. When application 56 generates New Configuration Key 122, application 56 uses TPM 44 to bind New Configuration Key 122 to Config2. As shown at block 214, application 56 then uses a TPM attestation identity key (AIK) and the TPM_CertifyKey function to generate a Certify Key credential that cryptographically attests to the bindings on New Configuration Key 122. Application 56 then sends the Certify Key credential to trusted upgrade manager 80 with a request for approval to migrate Root User Key 130 to New Configuration Key 122, as depicted at block 216.

Trusted upgrade manager 80 then determines whether or not to approve the request, as shown at block 220. For instance, trusted upgrade manager 80 may determine whether the Certify Key credential was signed by an AIK. Trusted upgrade manager 80 may examine the AIK's Identity Credential to verify that the AIK is protected by a valid TPM, which therefore indicates that the values in Certify Key are accurately reported. Trusted Upgrade Manager may also verify that the new configuration indicated by the Certify Key credential includes only approved versions of the system software and application 56.

If trusted upgrade manager 80 determines that the request came from a platform with a valid TPM and with an approved Config2, trusted upgrade manager 80 may return an approval message to processing system 20, as shown at block 222. For instance, the approval message may include instructions for TPM 44 to move Root User Key 130 to be a child of New Configuration Key 122 instead of Configuration Key 120. In response to receiving the approval, processing system 20 may migrate Root User Key 130 accordingly, as shown at block 224. Accordingly, the wavy arrow 132 in FIG. 3 illustrates that Root User Key 130 can be migrated to be a child of New Configuration Key 122 instead of Configuration Key 120.

Once TPM key structure 60 has been modified in this manner, application 56 can then load Root User Key 130 using New Configuration Key 122 when processing system is in the new configuration (as reflected by Config2). Similarly, the rest of the user key hierarchy (e.g., Signing Key A 140, Storage Key A 142, Storage Key B 150, etc.) can also be accessed from the new configuration. Consequently, processing system 20 may use any of those dependent keys, as indicated at block 226. Furthermore, processing system 20 need not create any new keys, other than New Configuration Key 122, to support use of the dependent keys in the new configuration of processing system 20.

However, if trusted upgrade manager 80 is not satisfied with the credential received from processing system 20, trusted upgrade manager 80 may return a message denying the migrate request, as shown at block 230. Consequently, TPM 44 may prevent application 56 from accessing any keys in upgradeable key structure 60.

Thus, if application 56 is a TPM-enabled media player application for example, that application may create a first set of keys that it uses to encrypt a second set of keys, and the second set of keys may be used to encrypt and/or decrypt music files purchased from a music store. For discussion purposes, the music store may be referred to as Acme. Acme, for example, may have a song "S1" that is encrypted with the key "Sk1." This encryption process may be represented by the function "Encrypt(Sk1, S1)." The result of the encryption process (i.e., the encrypted song) may be represented by the term "S1-enc." When someone at processing system 20 buys S1, processing system 20 may actually receive S1-enc and Sk1. S1-enc may be stored in mass storage 36, but application 56 should keep Sk1 protected so that unauthorized applications cannot access it. Other keys (e.g., Sk2, Sk3, etc.) may be used to create other encrypted song files (e.g., S2-enc, S3-end, etc.).

In order to protect Sk1, Sk2, . . . Skn, application 56 encrypts each of those keys with a Storage Key (e.g., Storage Key A 142), so that the only software which can decrypt the Sk's is a good version of application 56 running on good underlying software (where "good" means that the measurements of application 56 and the underlying software match the predetermined measurements of processing system with approved versions of application 56 and the underlying software). For instance, application 56 may create Configuration Key 120 with PCR bindings equal to an approved version of application 56 running on an approved version of OS 54. Consequently, other applications on processing system 20 cannot access the Sk's to decrypt the encrypted songs.

In addition, application 56 may create Root User Key 130, and may set the migration authority on that key to be equal to Acme. Thus Acme, which sells the encrypted songs, may also be selected as the entity to determine whether or not to allow Root User Key 130 to be migrated to a new configuration. This means that Acme will be responsible for approving migration of Root User Key 130 to a new parent key. Under Root User Key 130, application 56 creates Storage Key A 142 and encrypts all the Sk's with Storage Key A 142.

Furthermore, a key migration process such as the one described above can be used to allow application 56 to access the Sk's, even after application 56 has been upgraded to a newer version. As indicated above, before allowing such a migration, the trusted upgrade authority may verify that Config2 includes only approved system software and an approved version of application 56. Accordingly, when a new version of application 56 is installed, it creates New Configuration Key 122 with bindings to the current system software and the new version of application 56. Acme, and only Acme, can approve the migration of Root User Key 130 from Configuration Key 120 (which is locked to the old version of application 56) to New Configuration Key 122 (which is locked to the new version of application 56). Therefore, it is difficult or impossible for an unauthorized application to access the Sk's.

Other types of programs may use similar techniques to migrate TPM keys to provide key structures that allow access in new configurations. For instance, an OS may create a Configuration Key and a Root User Key, and then create a system service to allow applications to request their own keys. When the OS needs to get patched, the OS vendor, as the upgrade authority, approves the move of the Root User Key from the Configuration Key (locked to the original version of the OS) to the New Configuration Key (locked to the new version of the OS).

The teachings herein can also be used to allow recovery of data from a failed software upgrade or from other situations where the processing system is no longer able to get into the predefined safe or approved configuration. For instance, a Recovery Configuration Key may be created in addition to Configuration Key 120. This Recovery Configuration Key may not contain any PCR bindings; however, a recovery password may be included to restrict access to it. Root User Key 130 may be migrated such that either Configuration Key 120 or the Recovery Configuration Key may load it. If the OS suffers a catastrophic crash and is unable to boot into Config1, an information technology (IT) department may chose to temporarily boot from a recovery media. By entering the proper recovery password, the IT representative may use the Recovery Configuration Key to load Root User Key 130 from the unanticipated recovery environment in order to recover the system.

By contrast, with a conventional TPM key structure, it may be necessary to export the protected data before applying an upgrade, to create a completely new set of user keys at each upgrade, and then to re-encrypt the data to the new keys. Consequently, a conventional TPM key structure may be extremely cumbersome, may in some cases require acquisition of new credentials, and may be unable to support access from an unanticipated configuration such as during recovery.

In light of the principles and example embodiments described and illustrated herein, it will be recognized that the illustrated embodiments can be modified in arrangement and detail without departing from such principles. For instance, an upgradeable key structure may be created under a child or descendent of the SRK, rather that the SRK itself. For instance, there may be an OS Root Key between the SRK and the Configuration Key.

Also, upgradable key structures may be stacked. For instance, the OS may create an OS Configuration Key with a child Root User Key. In addition, individual applications may create respective Configuration Keys, each as a child or descendent of the Root User Key. For example, an application from Acme may create an Acme Configuration Key as a descendant of the OS Configuration Key, and an application from another company may create a third Configuration Key a descendant of the OS Configuration Key. The applications may then create Root User Keys as descendants of the respective application Configuration Keys (e.g., an Acme Root Key as a child of the Acme Configuration Key). Thus, a Configuration Key need not be the direct child of the SRK, but may be created as a child of any suitable TPM Storage Key.

Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for migrating a digital key, the method comprising:
   in a processing system including a processor, at least one mass storage device and a network interface controller, and having a first configuration, creating, via an application, a first configuration key having a binding to the first configuration as a descendant of a trusted platform module (TPM) storage root key (SRK) in the processing system;
   creating, via the application, a root user key as a descendant of the first configuration key, the root user key being a certified migratable key having no binding and associated with an upgrade authority of a second processing system external to the processing system and coupled to the processing system via the network interface controller;
   after the processing system has changed to a second configuration, creating, via the application, a second configuration key having a binding to the second configuration as a descendant of the SRK;
   thereafter sending a request to the upgrade authority for approval to migrate the root user key to the second configuration key;
   in response to receiving the approval from the upgrade authority, migrating the root user key to be a descendant of the second configuration key instead of the first configuration key; and
   creating, via the application, a first recovery configuration key having a password and not having a binding to either the first or second configuration and as a descendant of the SRK, and migrating the root user key to be loaded by the first recovery configuration key in a recovery environment of the processing system after an operating system failure, responsive to input of the password.

2. A method according to claim 1, further comprising:
   allowing access to the root user key when the processing system has the first configuration;
   changing the processing system from the first configuration to the second configuration; and
   after changing the processing system to the second configuration, allowing access to the root user key without requiring any new keys to have been created in the processing system, other than the second configuration key.

3. A method according to claim 1, further comprising:
   allowing access to the root user key when the processing system has the first configuration; and
   after the processing system has changed to the second configuration, preventing access to the root user key if approval has not been received from the upgrade authority.

4. A method according to claim 1, further comprising:
   generating a credential attesting to the second configuration; and
   transmitting the credential to the upgrade authority in conjunction with the request for approval to migrate the root user key.

5. A method according to claim 4, wherein the operation of generating a credential comprises:
   generating a certify key credential signed by an attestation identity key (AIK), wherein certify key credential comprises an identity credential to verify that the AIK is protected by a valid TPM.

6. A method according to claim 1, further comprising:
   creating a user key as a descendant of the root user key.

7. A method according to claim 1, wherein at least one dependent user key that is a descendant of the root user key comprises a plurality of dependent user keys, and further comprising setting an authorization to prevent individual migration of any of the plurality of dependent user keys from the first configuration to the second configuration.

8. A method according to claim 7, wherein the application that uses the at least one dependent user key while the processing system has the second configuration is a different version of the application than the application that uses the at least one dependent user key while the processing system has the first configuration.

9. A processing system comprising:
   a processing unit including a central processing unit (CPU);
   a trusted platform module (TPM) responsive to the processing unit;
   a least one storage component responsive to the processing unit; and
   a program stored in the at least one storage component;
   wherein the program includes instructions which, when executed, result in the processing system to perform operations comprising:
      creating a first configuration key as a descendant of a storage root key (SRK) of the TPM, the first configuration key associated with a first configuration of the processing system and having a binding to the first configuration;
      creating a root user key as a descendant of the first configuration key, the root user key being a certified migratable key having no binding and associated with an upgrade authority of a second processing system external to the processing system and coupled to the processing system via a network interface controller of the processing system;

after the processing system has changed to a second configuration, creating a second configuration key having a binding to the second configuration as a descendant of the SRK;

thereafter sending a request to the upgrade authority for approval to migrate the root user key to the second configuration key;

in response to receiving the approval from the upgrade authority, migrating the root user key to be a descendant of the second configuration key instead of the first configuration key; and creating a first recovery configuration key having a password and not having a binding to either the first or second configuration and as a descendant of the SRK, and migrating the root user key to be loaded by the first recovery configuration key in a recovery environment of the processing system after an operating system failure, responsive to input of the password.

10. A processing system according to claim 9, further comprising the TPM operable to perform operations comprising:

allowing access to the root user key when the processing system has the first configuration;

after the processing system has changed to the second configuration, allowing access to the root user key without requiring any new keys to have been created in the processing system, other than the second configuration key.

11. A processing system according to claim 9, further comprising the TPM operable to perform operations comprising:

allowing access to the root user key when the processing system has the first configuration; and after the processing system has changed to the second configuration, preventing access to the root user key if approval has not been received from the upgrade authority.

12. A processing system according to claim 9, wherein the operations further comprise:

generating a credential attesting to the second configuration; and transmitting the credential to the upgrade authority in conjunction with the request for approval to migrate the root user key.

13. A processing system according to claim 9, wherein at least one dependent user key that is a descendant of the root user key comprises a plurality of dependent user keys, and the processing system further operable to perform operations comprising setting an authorization to prevent individual migration of any of the plurality of dependent user keys from the first configuration to the second configuration.

14. A processing system according to claim 13, wherein an application that uses the at least one dependent user key while the processing system has the second configuration is a different version of the application that uses the at least one dependent user key while the processing system has the first configuration.

15. An apparatus comprising:

a non-transitory machine-accessible storage medium; and instructions in the non-transitory machine-accessible storage medium, wherein the instructions, when executed by a processing system with a trusted platform module (TPM), result in operations comprising:

creating a first configuration key as a descendant of a storage root key (SRK) of the TPM, the first configuration key associated with a first configuration of the processing system and having a binding to the first configuration;

creating a root user key as a descendant of the first configuration key, the root user key being a certified migratable key having no binding and associated with an upgrade authority of a second processing system external to the processing system and coupled to the processing system via a network interface controller of the processing system;

after the processing system has changed to a second configuration, creating a second configuration key having a binding to the second configuration as a descendant of the SRK;

thereafter sending a request to the upgrade authority for approval to migrate the root user key to the second configuration key;

in response to receiving the approval from the upgrade authority, migrating the root user key to be a descendant of the second configuration key instead of the first configuration key; and creating a first recovery configuration key having a password and not having a binding to either the first or second configuration and as a descendant of the SRK, and migrating the root user key to be loaded by the first recovery configuration key in a recovery environment of the processing system after an operating system failure, responsive to input of the password.

16. An apparatus according to claim 15, wherein the operations further comprise:

generating a credential attesting to the second configuration; and transmitting the credential to the upgrade authority in conjunction with the request for approval to migrate the root user key.

\* \* \* \* \*